No. 679,230.  
W. J. HOLLAND.  
VEHICLE HUB.  
(Application filed June 18, 1901.)  
Patented July 23, 1901.
(No Model.)
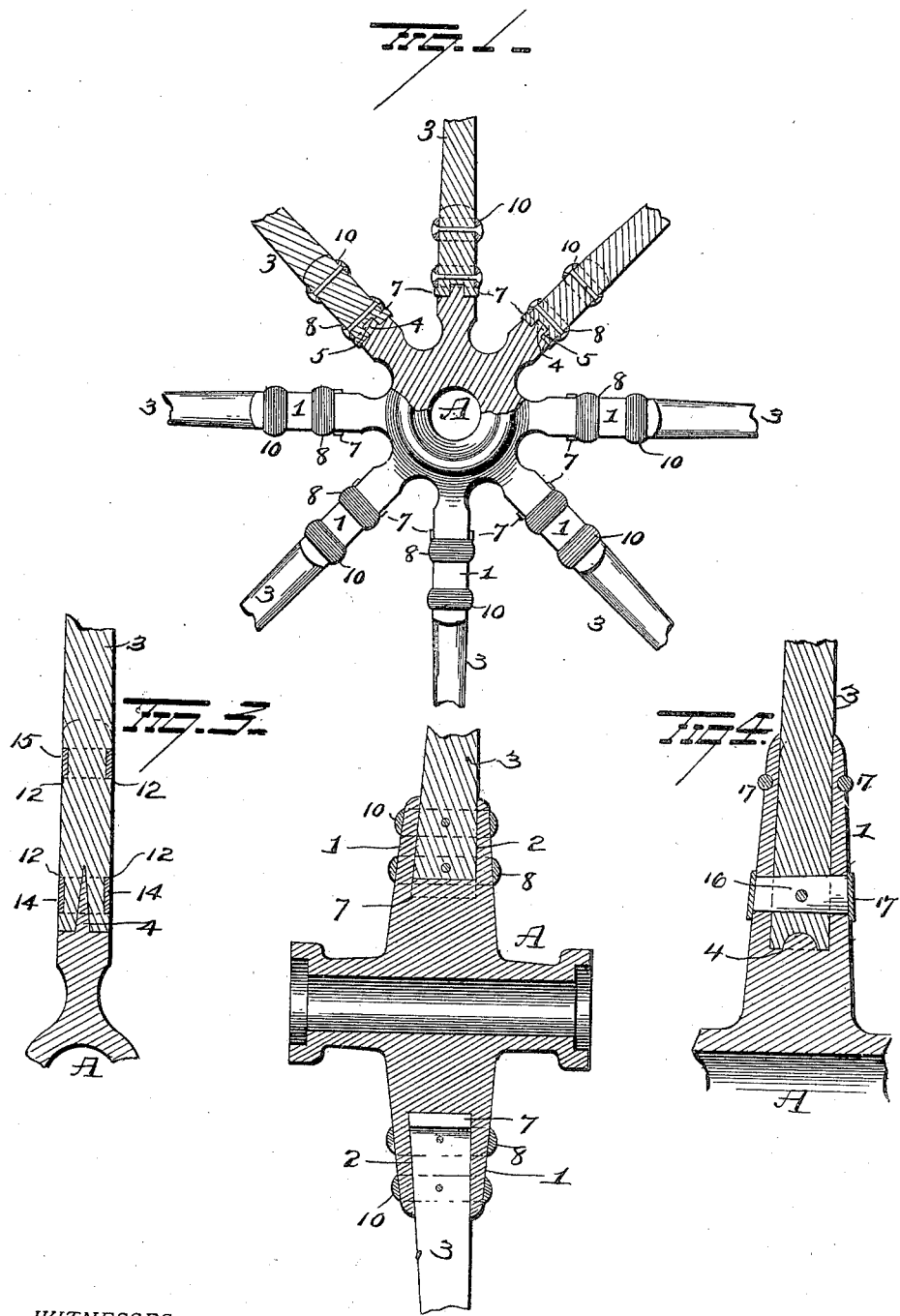

UNITED STATES PATENT OFFICE.

WILLIAM J. HOLLAND, OF ERIE, TEXAS.

VEHICLE-HUB.

SPECIFICATION forming part of Letters Patent No. 679,230, dated July 23, 1901.

Application filed June 18, 1901. Serial No. 65,052. (No model.)

*To all whom it may concern:*

Be it known that I, WILLIAM J. HOLLAND, of Erie, in the county of Cook and State of Texas, have invented certain new and useful Improvements in Vehicle-Hubs; and I do hereby declare the following to be a full, clear, and exact description of the invention, such as will enable others skilled in the art to which it appertains to make and use the same.
My invention relates to an improvement in vehicle-hubs, the object of the invention being to provide a metal hub designed to receive wooden spokes, which shall be simple and compact in construction, cheap to manufacture, and which shall be comparatively light without detracting from its strength.

With this object in view my invention consists in certain novel features of construction and combinations of parts, as will be hereinafter more fully described, and pointed out in the claims.

In the accompanying drawings, Figure 1 represents a view in side elevation of my improvement. Fig. 2 is a view in vertical section of the same, and Figs. 3 and 4 are views of modifications.

A represents a hub provided with a double row of outwardly-extending flanges 1, the flanges of one row being so disposed with respect to the flanges of the other row as to form a series of sockets 2 for the reception of the inner ends of spokes 3. Within each of the sockets thus formed and integral with the bottom thereof is located a tenon 4, adapted to enter a mortise 5 in the inner end of spoke 3 when the latter is driven into its socket 2, whereby the lower end of the spoke is firmly locked against lateral movement or displacement. The exposed faces of each spoke near the lower end thereof are provided with ribs 7, against which rest the inner edge of a locking-band 8. This band passes entirely around the exposed flanges forming the socket 2 for the spoke and in contact with opposite faces of the spoke, and not only locks the spoke firmly within its socket, but also, by means of its contact with the ribs 7, prevents the spoke from creeping or moving outwardly. To prevent any possibility of lateral displacement, I prefer to employ another band 10, which encircles the flanges 1 and the spoke 3 in proximity to the free ends of said flanges. Both bands 8 and 10 are secured in place by means of pins or other suitable fastening devices.

In the form of my invention shown in Fig. 3 the spoke is provided in its respective faces, near its inner end, with elongated grooves 12, and the flanges constituting the socket for the spoke are made with notches in each edge to aline with the grooves in the faces of the spoke. A band 14 is then placed around the flanges and shrunk into the grooves of the spoke and the notches of the flanges, the shoulders formed by the walls of said grooves and notches constituting means which coöperate with the band to lock the spoke in place. A second band 15 may be similarly secured in place at or near the free ends of the flanges.

Instead of the means hereinbefore described as coöperating with the band to hold the spokes in place in their sockets I might employ a key or wedge 16, passing through slots in the flanges 1 and the spoke 3, the said keys or wedges being retained in place by bands 17, encircling the flanges 1 and secured thereto in either of the ways hereinbefore described or in any other desired manner.

By means of my improvements I am enabled to construct a hub from a small amount of metal, and thus reduce the weight of the hub to a minimum without in any wise impairing the strength and stability of the finished wheel.

While I have shown and described my improved hub as being made in a single piece, it is evident that it can be manufactured in two parts or sections, in which event bolts or other means well known in the art may be employed for fastening the sections together.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. The combination in a hub, of two series of flanges coöperating to form a series of sockets, a spoke in each socket, a band encircling each pair of flanges and the spoke in the socket formed thereby and means coöperating with the bands and the spokes to lock the latter in place.

2. The combination in a hub, of two series of flanges coöperating to form a series of sockets, of a spoke in each socket, a band encircling each pair of flanges constituting a socket and ribs on the spokes to be engaged by the bands to secure the said spokes in place.

3. The combination in a hub, of two series of flanges, coöperating to form a series of sockets, of a spoke in each socket, a band encircling each pair of flanges constituting a socket, means for securing said bands against lateral displacement, and ribs on the spokes to be engaged by the bands to secure the said spokes in place.

4. The combination in a hub, of two series of flanges coöperating to form a series of sockets, of a spoke in each socket, a band encircling each pair of flanges constituting a socket, pins passing through the bands and entering the spokes and ribs on the spokes to be engaged by the bands to secure the said spokes in place.

In testimony whereof I have signed this specification in the presence of two subscribing witnesses.

WILLIAM J. HOLLAND.

Witnesses:
S. G. NOTTINGHAM,
G. F. DOWNING.